United States Patent Office 3,787,404
Patented Jan. 22, 1974

3,787,404
NOVEL 1,2-BENZOTHIAZINE DIOXIDES AND PRECURSORS THEREFOR
Chris Royce Rasmussen, Ambler, Pa., assignor to McNeil Laboratories, Inc.
No Drawing. Filed Oct. 2, 1972, Ser. No. 294,126
Int. Cl. C07d 93/02
U.S. Cl. 260—243 R    3 Claims

ABSTRACT OF THE DISCLOSURE

The compounds herein are:
(I) 2,3,5,6-tetrahydro - 13H - oxazolo[2',3',:3,4]pyrazino[1,2-b]-1,2-benzothiazin-13-one 8,8 - dioxide, useful for its anti-inflammatory and diuretic properties;
(II) (1,2,3,4-tetrahydro - 11 - hydroxy-1-oxopyrazino [1,2-b]-1,2-benzothiazin-2-yl)ethyl methanesulfonate 6,6-dioxide, useful as a precursor for making (I); and
(III) 1,2,3,4 - tetrahydro-11-hydroxy-2-(2-hydroxyethyl)pyrazino[1,2-b]-1,2-benzothiazin - 1 - one 6,6-dioxide, useful as a precursor for making (II).

---

This invention relates to novel benzothiazine dioxides and, more particularly, to such compounds having the following formulas:

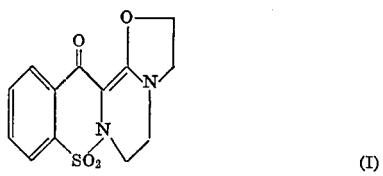

(I)

which compound is known as 2,3,5,6-tetrahydro-13H-oxazolo[2',3':3,4]pyrazino[1,2-b]-1,2-benzothiazin - 13 - one 8,8-dioxide;

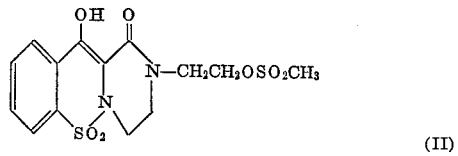

(II)

which compound is known as (1,2,3,4-tetrahydro-11-hydroxy-1-oxopyrazino[1,2 - b]-1,2-benzothiazin-2-yl)ethyl methanesulfonate 6,6-dioxide; and

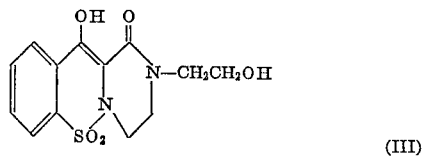

(III)

which compound is known as 1,2,3,4-tetrahydro-11-hydroxy-2-(2-hydroxyethyl)pyrazino[1,2 - b]-1,2-benzothiazin-1-one 6,6-dioxide.

The compound of Formula I may be prepared from the compound of Formula II by several methods. For example, by treating (II) with a slight molar excess of sodium methoxide in dimethylformamide, ring closure to the desired compound of Formula I is obtained. A second method of preparing (I) is to treat Compound II with a large molar excess of an alkali metal carbonate in a suitable organic solvent such as a lower alkyl ketone or lower alkanol, preferably under reflux. The preferred method of preparing (I) is to treat (II) with a slight molar excess of triethylamine in a lower alkanol. Elevated temperatures are employed to enhance the rate of the reaction; reflux temperatures are preferably employed.

The foregoing reactions may be illustrated as follows:

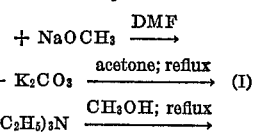

The compound of Formula II may be prepared from the compound of Formula III by treating the latter with a slight molar excess of methanesulfonyl chloride in a base such as pyridine at a temperature betwen —10° C. and +10° C. In turn, the compound of Formula III may be prepared by treating the known compound, ethyl 4-hydroxy-2H-1,2-benzothiazine-3-carboxylate 1,1 - dioxide (IV) (disclosed in U.S. Pat. No. 3,501,466), with a slight molar excess of N-(2-hydroxyethyl)aziridine. The aziridine is added slowly in solution with a suitable organic solvent, such as, for example, a lower alkanol, e.g., methanol, ethanol, propanol, isopropanol, and the like; an ether, e.g., ethyl ether, tetrahydrofuran, dioxane, and the like; an aromatic hydrocarbon, e.g., benzene, toluene, xylene, and the like; dimethylsulfoxide; or dimethylformamide. Elevated temperatures may be used to enhance the rate of reaction; temperatures from 75–100° C. are preferred. The foregoing reactions may be illustrated as follows:

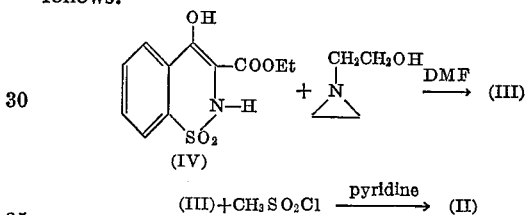

The terms "lower alkyl" and "lower alkanol," as used herein, mean straight or branched chain saturated aliphatic hydrocarbons having from one to about five carbon atoms; e.g. methyl, ethyl, propyl, isopropyl, pentyl, and the like; and the corresponding alcohols.

The compound of Formula I is useful for its pharmacological properties. Anti-inflammatory activity has been observed, for example, in the kaolin-induced rat paw edema assay, wherein a 24% inhibition occurs at an oral dose of about 100 mg./kg. body weight.

Furthermore, this Compound I functions as a diuretic. In the rat, an oral dose of about 100 mg./kg. body weight is observed to produce an increase of urine output of 89–97% after four hours and 22–36% after 24 hours, as compared to control animals given placebo.

The compounds of Formulas II and III are useful as precursors in the synthesis of the Compound I for their pharmacological properties. For example, Compounds II and III have been observed to produce ataxia in the mouse at doses of 100 mg./kg. body weight i.p. and 30 mg./kg. body weight i.p., respectively, which is indicative of central nervous system depressant activity.

The following examples are intended to illustrate, but not to limit, the scope of this invention.

EXAMPLE I 2,3,5,6-tetrahydro-13H-oxazolo[2',3':3,4]pyrazino [1,2-b]-1,2-benzothiazin-13-one 8,8-dioxide A solution of sodium methoxide in dimethylformamide is prepared by dissolving 3.9 g. (0.17 mole) of sodium in methanol. Excess methanol is removed in vacuo, and 50 ml. of dimethylformamide is added. This solution is added dropwise to a stirred suspension of 57 g. (0.149 mole) of (1,2,3,4-tetrahydro-11-hydroxy-1-oxopyrazino [1,2-b]-1,2-benzothiazin-2-yl)ethyl methanesulfonate 6,6-dioxide in 50 ml. dimethylformamide over a period of 15 minutes. After the solvent is removed in vacuo, water is added to the residue and the resulting solid is collected by filtration, yielding the product, 2,3,5,6-tetrahydro-13H-oxazolo[2′,3′:3,4]pyrazino[1,2-b] - 1,2 - benzothiazin-13-one 8,8-dioxide, M.P. 199–200° C.

*Analysis.*—Calcd. for $C_{13}H_{12}N_2O_4S$ (percent): C, 53.43; H, 4.14; N, 9.59. Found (percent): C, 53.30; H, 4.18; N, 9.59.

EXAMPLE II (1,2,3,4-tetrahydro-11-hydroxy-1-oxopyrazino [1,2-b]-1,2-benzothiazin-2-yl)ethyl methanesulfonate 6,6-dioxide A solution of 139 g. (0.45 mole) of 1,2,3,4-tetrahydro-11-hydroxy-2-(2-hydroxyethyl)pyrazino[1,2-b]-1,2-benzothiazin-1-one 6,6-dioxide in 480 ml. of anhydrous pyridine is prepared and cooled to 0° C. in a ice-salt bath. To this stirred solution is added 95.76 g. (0.84 mole) of methanesulfonyl chloride at such a rate that the temperature remains below 0° C. When the addition is complete the reaction mixture is poured into an ice-hydrochloric acid mixture, and the resulting solid is filtered off, yielding the product, (1,2,3,4 - tetrahydro-11-hydroxy-1-oxopyrazino [1,2-b]-1,2-benzothiazin-2-yl)ethyl methanesulfonate 6,6-dioxide, M.P. 160–165° C. Recrystallization of the crude product from dioxane-methanol yields the pure product, M.P. 174–175° C.

*Analysis.*—Calcd. for $C_{14}H_{16}N_2O_7S_2$ (percent): C, 43.29; H, 4.15; N, 7.21; S, 16.51. Found (percent): C, 43.28, 43.19; H, 4.15, 4.25; N, 7.21, 7.19; S, 15.67.

EXAMPLE III 1,2,3,4-tetrahydro - 11 - hydroxy - 2 - (2 - hydroxyethyl) pyrazino[1,2-b]-1,2-benzothiazine-1-one 6,6-dioxide To a well-stirred solution of 73.5 g. (0.273 mole) of ethyl - 4 - hydroxy-2H-1,2-benzothiazine - 3 - carboxylate 1,1-dioxide in 120 ml. of dimethylformamide warmed on a steam bath is added dropwise over a period of one hour a solution of 31.7 g. (0.364 mole) of N-(2-hydroxyethyl) aziridine in 50 ml. of dimethylformamide. Five minutes after the addition is complete, the reaction mixture is poured over excess cracked ice, and the resulting oily mass is stirred and scratched until crystallization occurs. The product is collected by filtration and, while still slightly damp, is taken up in 250 ml. of boiling acetone and filtered and the filtrate is concentrated until a large amount of solid has separated from the hot solution. This resulting solution and solid are treated with 50 ml. of methanol, cooled in ice-water, and filtered, yielding the product, 1,2,3,4 - tetrahydro-11-hydroxy-2-(2-hydroxyethyl)pyrazino[1,2-b]-1,2-benzothiazin - 1 - one 6,6-dioxide, M.P. 157–160° C. Recrystallization from acetone-methanol raises the melting point to 158–161° C.

*Analysis.*—Calcd. for $C_{13}H_{14}N_2O_5S$ (percent): C, 50.31; H, 4.55; N, 9.03; S, 10.33. Found (percent): C, 50.19; H, 4.58; N, 9.02; S, 10.35.

What is claimed is:

1. 2,3,5,6-tetrahydro-13H - oxazolo[2′,3′:3,4]pyrazino-[1,2-b]-1,2-benzothiazin-13-one 8,8-dioxide.

2. (1,2,3,4-tetrahydro - 11 - hydroxy - 1 - oxopyrazino-[1,2-b]-1,2-benzothiazin - 2 - yl)ethyl methanesulfonate 6,6-dioxide.

3. 1,2,3,4-tetrahydro-11-hydroxy-2-(2 - hydroxyethyl) pyrazino[1,2-b]-1,2-benzothiazin-1-one 6,6-dioxide.

References Cited

UNITED STATES PATENTS 3,408,347    10/1968    Shavel et al. _____ 260—243

JOHN M. FORD, Primary Examiner

U.S. Cl. X.R.

424—246